United States Patent [19]

Takahashi

[11] Patent Number: 4,941,780
[45] Date of Patent: Jul. 17, 1990

[54] INDEXABLE CUTTING INSERT

[75] Inventor: Nobuhiro Takahashi, Hyogo, Japan

[73] Assignee: Sumitomo Electric Industries, Ltd., Osaka, Japan

[21] Appl. No.: 271,669

[22] Filed: Nov. 16, 1988

[30] Foreign Application Priority Data

Nov. 24, 1987 [JP] Japan .................. 62-177638[U]
Jun. 20, 1988 [JP] Japan .................. 63-80642[U]

[51] Int. Cl.$^5$ .................................................. B23B 27/22
[52] U.S. Cl. ..................................................... 407/114
[58] Field of Search ............... 407/113, 114, 115, 116, 407/117, 119

[56] References Cited

U.S. PATENT DOCUMENTS

| | | | |
|---|---|---|---|
| 3,487,515 | 1/1970 | Contrucci | 407/114 |
| 4,441,841 | 4/1984 | Mori | 407/114 |
| 4,507,024 | 3/1985 | Stashko | 407/114 |
| 4,597,696 | 7/1986 | Maeda et al. | 407/114 |
| 4,626,141 | 12/1986 | Malaker | 407/114 |
| 4,741,649 | 5/1988 | Mori | 407/114 |
| 4,787,784 | 11/1988 | Bernadic et al. | 407/114 |
| 4,832,541 | 5/1989 | Noguchi | 407/114 |

Primary Examiner—Frederick R. Schmidt
Assistant Examiner—Blynn Shideler
Attorney, Agent, or Firm—Laff, Whitesel, Conte & Saret

[57] ABSTRACT

An indexable cutting insert of a polygonal shape including a plurality of nose portions formed at vertexes of the polygonal shape, respectively, a cutting edge formed between neighboring ones of the nose portions, a land portion formed inside the cutting edge and a dimple formed, in the vicinity of each of the nose portions and the land portion, inside each of the nose portions, with the cutting edge being inclined upwardly in a direction away from each of the nose portions.

1 Claim, 4 Drawing Sheets

Fig. 1 PRIOR ART    Fig. 2 PRIOR ART
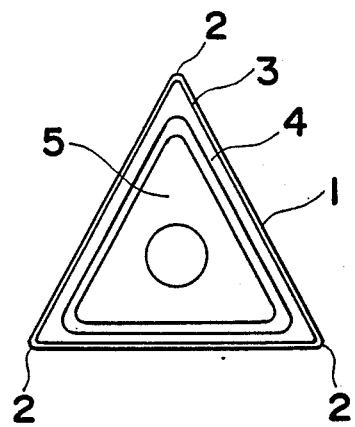
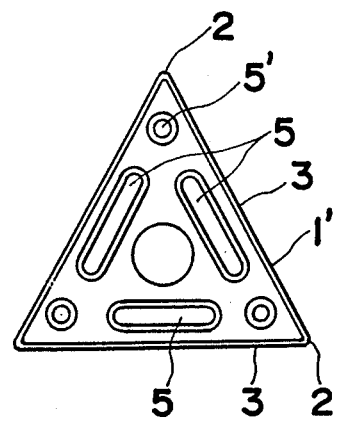
Fig. 3 PRIOR ART
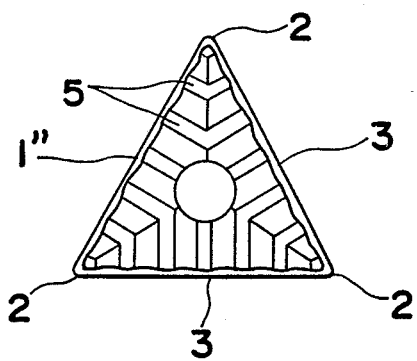
Fig. 4 PRIOR ART    Fig. 5 PRIOR ART
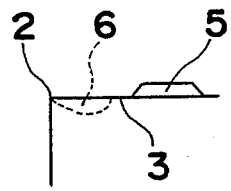
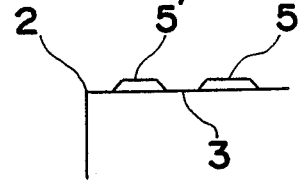

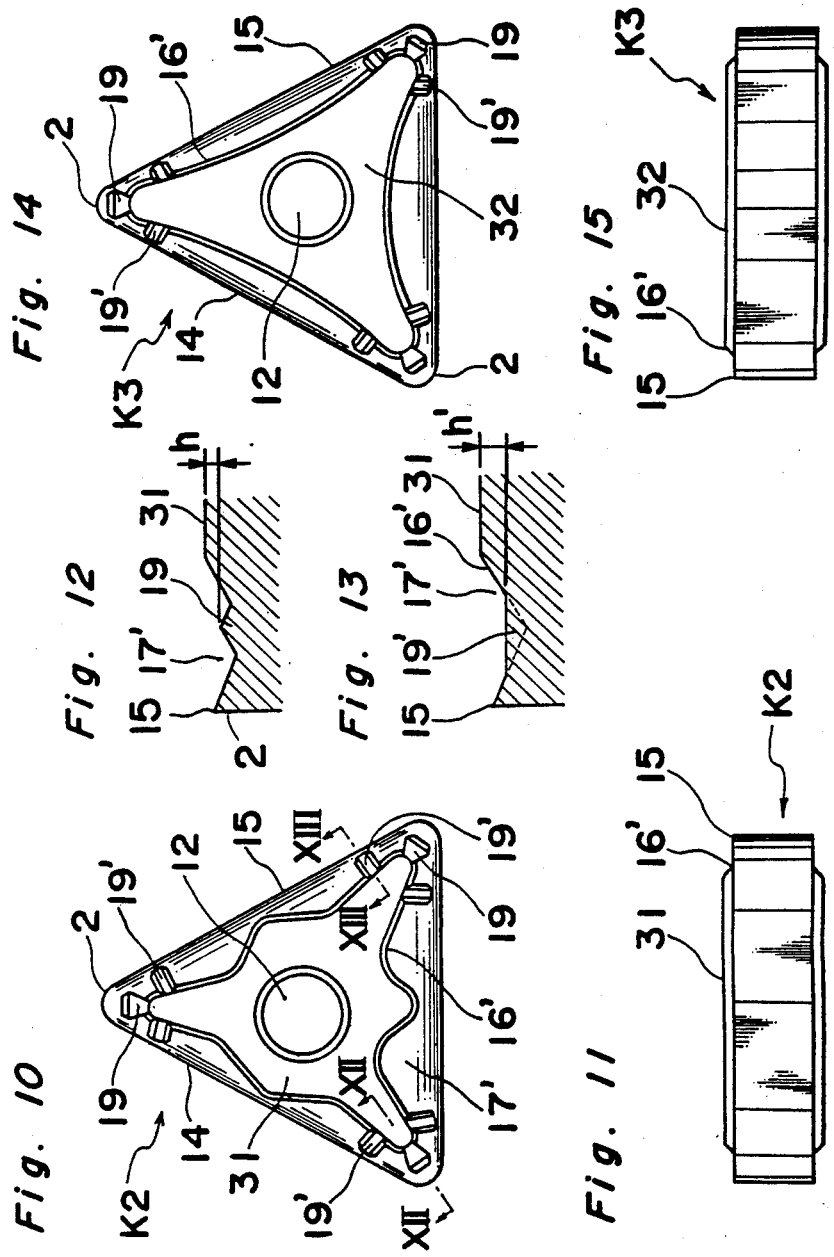

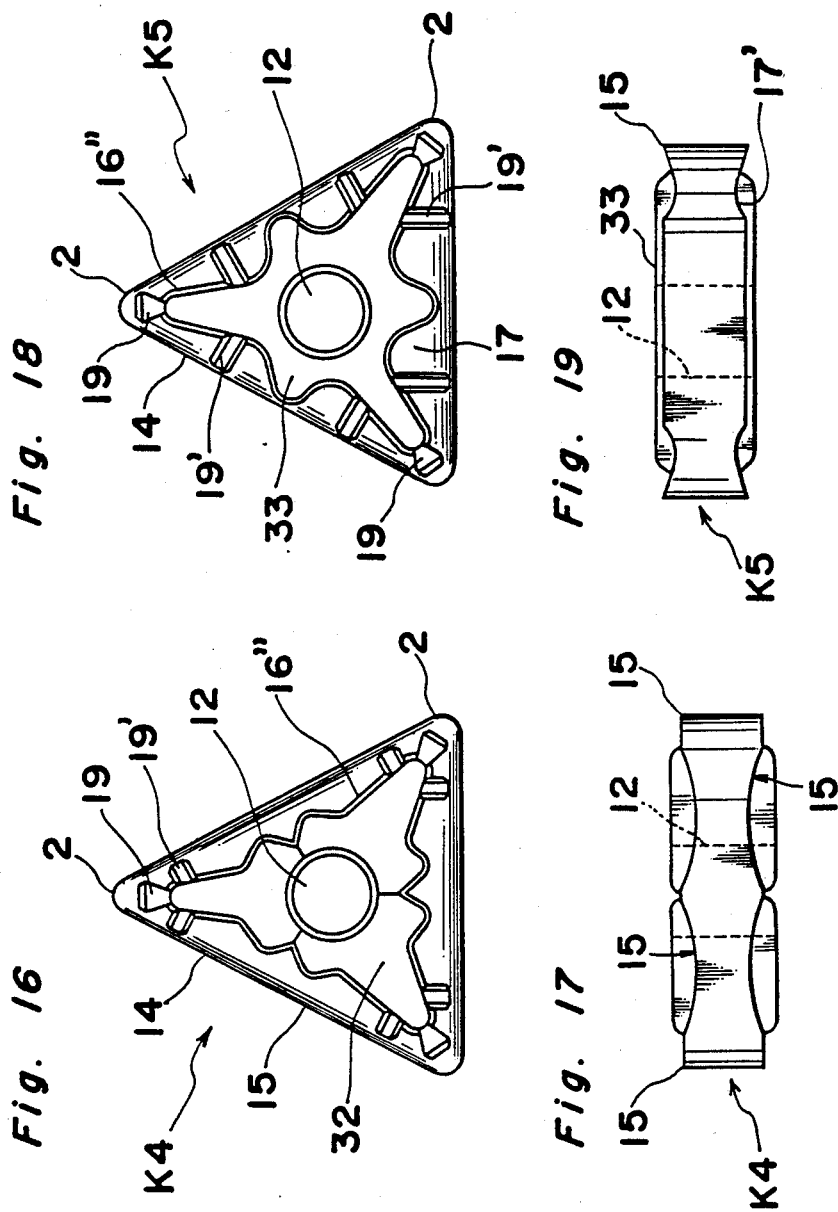

INDEXABLE CUTTING INSERT

BACKGROUND OF THE INVENTION

The present invention relates to an indexable cutting insert used for cutting machine parts, etc.

More specifically, in the present invention, the indexable cutting insert has a polygonal shape such as a triangle, a quadrangle or the like. Circular nose portions are, respectively, formed at vertexes of the indexable cutting insert. A cutting edge for effecting cutting directly is linearly formed between neighboring ones of the nose portions. A land portion and a dimple are formed inside the cutting edge so as to constitute a chip breaker. Especially, the cutting edge between the neighboring nose portions is linearly inclined upwardly in a direction away from each of the neighboring nose portions. Thus, the dimple having a predetermined shape of a recess is formed adjacent to and inside each of the nose portions so as to be disposed adjacent to the land portion through a chip breaker wall surface, etc. Thus, the indexable cutting insert of the present invention has excellent copying functions having a wide range of applications including rough cutting, medium cutting and finish cutting.

Machined parts are widely used in many fields of industry and machining accuracy of the machined parts has been improved greatly. Recently, there is a keen demand for higher machining accuracy of the machined parts. A majority of machine parts are subjected to rough cutting, medium cutting and finish cutting in many cases. Hence, since the machine parts are subjected to cutting many times, complicated processes and strict accuracy are required for resharpening cutting tools for cutting the machine parts, thereby resulting in rise of production cost of the machine parts. Therefore, in order to obviate such an inconvenience, indexable cutting inserts have been recently used widely. In order to enable the indexable cutting inserts to be used many times, a circular nose portion is provided at each of vertexes of each of the indexable cutting inserts and a cutting edge is provided between neighboring ones of the vertexes. For example, as shown in FIGS. 1 to 3, indexable cutting inserts 1, 1' and 1" shown in FIGS. 1 to 3, respectively and having a triangular or quadrangular shape enabling repeated use are employed. In FIG. 1, the indexable cutting insert 1 has three circular nose portions 2. Three cutting edges 3' are linearly formed between neighboring ones of the nose portions 2. A land portion 5 having a predetermined size is provided inside each of the cutting edges 3' through a chip breaker groove 4. Thus, in the indexable cutting insert 1, since its cross-sectional shape taken along each of the cutting edges 3 is uniform, the indexable cutting insert 1 can be manufactured easily. Furthermore, in the indexable cutting insert 1, since an obstacle is not present in the vicinity of the nose portions 2, cutting can be performed easily by the indexable cutting insert 1. However, the indexable cutting insert 1 is disadvantageous in that it is difficult to perform cutting having variable depth of cut or finish cutting having a small depth of cut by the indexable cutting insert 1.

Meanwhile, in the indexable cutting inserts 1' and 1" shown in FIGS. 2 and 3, respectively, since the cross-sectional shape changes along each of the cutting edges 3 and the land portion 5 or a projection 5' is formed also in the vicinity of each of the nose portions 2 as shown in FIG. 5, chip disposal can be performed in a wider region than the idexable cutting insert 1. However, the indexable cutting inserts 1' and 1" have such drawbacks that the land portion 5 or the projection 5' functioning effectively during finish cutting having a small depth of cut not only increases the cutting resistance during medium cutting or rough cutting but causes clogging of chips, thereby resulting in restriction of region of chip disposal.

Furthermore, there is a known indexable cutting insert in which a dimple 6 is provided adjacent to each of the nose portions in place of the land portion 5 or the projection 5' as shown in FIG. 4. However, in this known indexable cutting insert, the cutting edge becomes sharp excessively and thus, becomes weak. Therefore, the known indexable cutting insert cannot be used for rough cutting. As a result, the known indexable cutting insert is exclusively used for finish cutting and therefore, cannot be versatilely used for cutting.

Accordingly, the prior art indexable cutting inserts referred to above have fundamental patterns shown in FIGS. 4 and 5 and cannot be used for a wide range of cutting including rough cutting, medium cutting and finish cutting, namely, should be restricted, in application, to one of rough cutting, medium cutting and finish cutting.

Meanwhile, in order to increase region of chip disposal of the prior art indexable cutting inserts in which the cutting edges between neighboring ones of the nose portions are used for rough cutting and the cutting edges of the nose portions are used for light cutting such as finish cutting having a small depth of cut and a low feed rate, various improvements have been proposed. For example, in Japanese Utility Model Publication (examined) Nos. 36562/1987 and 32723/1987, projecting ridges are integrally projected from groove walls of a boss surface and a chip breaker groove so as to be symmetrical with respect to a bisector extending from each of vertex portions of the boss surface towards each of the nose portions. In this known indexable cutting insert, region of chip disposal is increased in light cutting but such undesirable phenomenon take place that chips proceeding from the cutting edge during rough cutting collide with the projecting ridges and are bent by the projecting ridges. Thus, the known indexable cutting insert cannot be used for all cutting ranges.

In order to solve this problem, Japanese Utility Model Publication (examined) No. 10883/1988 has proposed an arrangement in which the projecting ridge projecting from a portion of the boss surface confronting the nose portion extends integrally from the groove wall of the boss surface or rise integrally from the chip breaker groove. Furthermore, an arrangement is known in which the projecting ridge is formed stepwise from the boss surface to the nose portion so as to define height therebetween such that capability of chip disposal is increased in cutting ranging from light cutting to rough cutting. However, these known arrangements are primarily designed to increase region of chip disposal in light cutting of the prior art indexable cutting inserts shown in FIGS. 1 to 3. Thus, the known arrangements have such a drawback that at the time of medium cutting for performing a cutting operation approximate to rough cutting, cutting resistance becomes large, thereby resulting in clogging of chips to be discharged.

SUMMARY OF THE INVENTION

Accordingly, an essential object of the present invention is to provide, with a view to eliminating the disadvantages inherent in conventional indexable cutting inserts, an indexable cutting insert which greatly increases effective region of chip disposal without incurring reduction of strength of an edge of a projection and can be securely used for a wide range of cutting including rough cutting, medium cutting and finish cutting so as to greatly contribute to machining technology for producing machine parts.

Another important object of the present invention is to provide an indexable cutting insert of the above described type which has a long service life and can machine the machine parts with high accuracy.

Still another object of the present invention is to provide an indexable cutting insert of the above described type which can be handled easily and can be produced at low cost.

Initially, in the case where rough cutting having a large depth of cut is performed by the indexable cutting insert according to one embodiment of the present invention, a wall surface of a land portion functions to reduce height of the land portion relative to a cutting edge and width of a chip breaker increases and thus, chips flow smoothly, thereby resulting in prevention of clogging of chips. Meanwhile, since the cutting edge of the indexable cutting insert is set at a predetermined negative angle, strength of the cutting edge does not drop such that rough cutting is performed securely.

Meanwhile, in the case of medium cutting having a slightly large depth of cut, since a dimple and a chip breaker wall surface are formed at low portions, chips pass over the dimple and the chip breaker wall surface, so that resistance of chips against the indexable cutting insert is reduced and thus, interference between chips and the indexable cutting insert is decreased. Therefore, since chips are cut only at the wall surface of the land portion, medium cutting is performed smoothly in the same manner as rough cutting.

Furthermore, in the case of finish cutting having a small depth of cut, the chip breaker surface extending, in the vicinity of a circular nose portion, from the dimple to the land portion functions effectively to cut chips. Since the cutting edge is linearly inclined, between neighboring ones of the nose portions, upwardly in a direction away from each of the neighboring nose portions, the dimple is not required to be formed so deeply as the conventional indexable cutting inserts, so that drop of strength of the cutting edge is small and the cutting edge is kept sharp for a long time such that finish cutting is performed securely through expansion of region of chip disposal.

BRIEF DESCRIPTION OF THE DRAWINGS

These objects and features of the present invention will become apparent from the following description taken in conjunction with the preferred embodiments thereof with reference to the accompanying drawings, in which:

FIGS. 1 to 3 are top plan views of prior art indexable cutting inserts, respectively (already referred to);

FIGS. 4 and 5 are fragmentary side elevational views of the prior art indexable cutting inserts of FIGS. 1 to 3 (already referred to);

FIG. 10 a top plan view of an indexable cutting insert according to a second embodiment of the present invention;

FIG. 11 is a side elevational view of the indexable cutting insert of FIG. 10;

FIGS. 12 and 13 are sectional views taken along the lines XII—XII and XIII—XIII in FIG. 10, respectively;

FIGS. 14 and 15 are views similar to FIGS. 10 and 11, respectively, particularly showing a third embodiment of the present invention;

FIGS. 16 and 17 are views similar to FIGS. 10 and 11, respectively, particularly showing a fourth embodiment of the present invention; and FIGS. 18 and 19 are views similar to FIGS. 10 and 11, respectively, particularly showing a fifth embodiment of the present invention.

Before the description of the present invention proceeds, it is to be noted that like parts are designated by reference numerals throughout several views of the accompanying drawings.

DETAILED DESCRIPTION OF THE INVENTION

Figure 6:
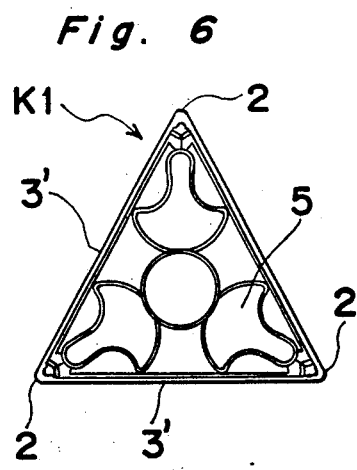
FIG. 6 is a top plan view of an indexable cutting insert according first embodiment of the present invention.
Figure 7:
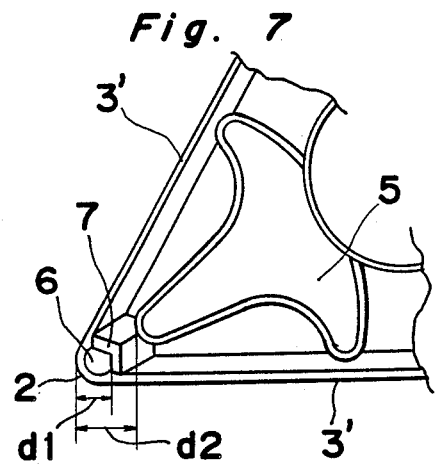
FIG. 7 is an enlarged fragmentary top plan view of the indexable cutting insert of FIG. 6.
Figure 8:
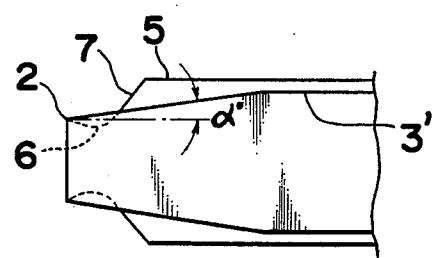
FIG. 8 is a side elevational view of FIG. 7.

Referring now to the drawings, there is shown in FIGS. 6 to 9, an indexable cutting insert K1 according to a first embodiment of the present invention. The indexable cutting insert K1 has a triangular shape and three circular nose portions 2 are, respectively, formed at three vertexes of each of upper and lower faces of the indexable cutting insert K1. On each of the upper and lower faces of the indexable cutting insert K1, three cutting edges 3' are formed between neighboring ones of the nose portions 2. As shown in FIG. 8, each cutting edge 3' is so formed as to be linearly inclined upwardly from each of the neighboring nose portions 2 at an angle $\alpha$ relative to a horizontal plane of the indexable cutting insert K1. It is to be noted that all directional or positional indications such as "upper", "lower" and "horizontal" relate to illustration in FIG. 8, hereinbelow.

Meanwhile, a land portion 5 is formed inside each cutting edge 3' so as to extend fanwise such that the land portion 5 is disposed higher than each cutting edge 3'. At an inner portion of each nose portion 2 confronting a distal end portion of the land portion 5, a dimple 6 is recessed lower than the cutting edge 3'. A chip breaker wall surface 7 extends between the dimple 6 and the land portion 5 so as to be inclined at a predetermined angle relative to the land portion 5. In FIG. 7, a distance d1 from the nose portion 2 to an innermost portion of the dimple 6 is set at 0.3 to 2.0 mm such that the dimple 6 exhibits an optimum performance. The angle $\alpha$ is set at 2° to 10° so as to make the cutting edge 3' optimum for finish cutting such that drop of strength of the cutting edge 3' is prevented in combination with the above described setting of the distance d1.

Referring still to FIG. 7, in medium cutting, in order to pass chips above the dimple 6 and the chip breaker wall surface 7, namely in order to reduce resistance of chips, a distance d2 from the nose portion 2 to the distal end portion of the land portion 5 is set at 1.0 to 4.0 mm such that chips are cut only by thickness of the land portion 5.

Hereinbelow, operation of the indexable cutting insert K1 of the above described arrangement is described. As described above, the cutting edge 3' is inclined upwardly from the nose portion 2 at the angle α of 2° to 10°. Thus, in case finish cutting is performed by the indexable cutting insert K1, sufficient sharpness of the cutting edge 3' is ensured. Meanwhile, since the distance d1 from the nose portion 2 to the innermost portion of the dimple 6 is set at 0.3 to 2.0 mm, the chip breaker wall surface 7 functions effectively such that chips are efficiently cut by the dimple 6 and the chip breaker wall surface 7. As a result, finish cutting is performed smoothly through reduction of drop of strength of the cutting edge 3'.

Meanwhile, in the case of medium cutting having a depth of cut of, for example, 1 to 4 mm larger than that of finish cutting, chips pass over dimple 6 and the chip breaker wall surface 7. Therefore, resistance of chips against the indexable cutting insert K1 is reduced and interference between chips and the indexable cutting insert K1 is decreased such that chips are cut only through thickness of the land portion 5. In this case, since the distance d2 from the nose portion 2 to the distal end portion of the land portion 5 is set at 1.0 to 4.0 mm, chips are cut by the land portion 5 more effectively.

Then, in the case of rough cutting having a depth of cut of, for example, 4 mm or more, height of the land portion 5 relative to the cutting edge 3' is reduced and width of the chip breaker is increased. As a result, since chips flow smoothly without clogging. Meanwhile, since the angle α is set at 2° to 10° negatively, the cutting edge 3' has large strength and thus, rough cutting is performed smoothly.

Consequently, chip disposal can be performed in a wide region by maintaining both sharpness and strength of the cutting edge 3' at high levels over an extensive range of cutting including finish cutting, medium cutting and rough cutting and thus, a chip breaker function is fully performed.

Figure 9:
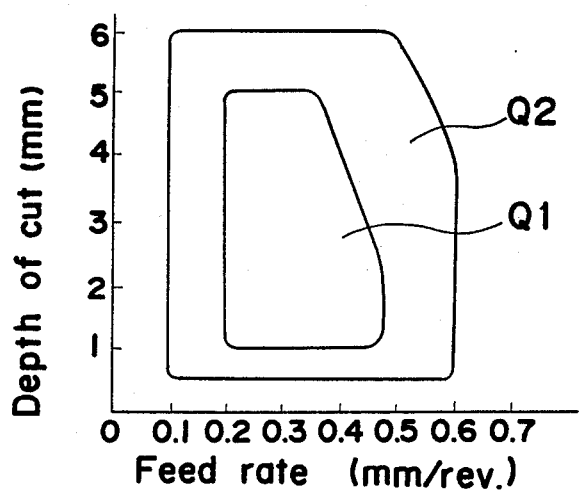
FIG. 9 is a graph indicative of comparison between the indexable cutting insert of FIG. 6 and a conventional indexable cutting insert.

FIG. 9 is a graph for comparing a region Q2 of chip disposal of the indexable cutting insert K1 of the present invention with a region Q1 of chip disposal of a prior art indexable cutting insert. In FIG. 9, the abscissa represents feed rate (mm/rev.), while the ordinate represents depth of cut (mm). As will be seen from FIG. 9, the region Q2 of chip disposal of the indexable cutting insert K1 is considerably larger that the region Q1 of chip disposal of the prior art indexable cutting insert. Meanwhile, in this experiment, a workpiece to be cut is made of chromium molybdenum steel "SCM435" of JIS (Japanese Industrial Standards) and has Brinell hardness $H_B$ of 250, while a cutting speed is 150 m/min. and a cutting tool employed is specified as "PCLNR2525-43CNMG120408" of ISO (International Organization for Standardization).

In the above described embodiment, the indexable cutting insert K1 has a triangular shape but may employ various other shapes such as a quadrangle, a pentagon, etc.

As is clear from the foregoing, in the first embodiment of the present invention, cutting in an overall range including rough cutting, medium cutting and finish cutting can be performed efficiently without drop of strength of the cutting edge by the single indexable cutting insert K1. Furthermore, in the indexable cutting insert K1, such an excellent effect can be achieved that chip breaker function against chips can be performed in a wide range. Thus, in the indexable cutting insert K1, region of chip disposal can be remarkably improved without sacrifice of cutting function, sharpness or strength of the cutting edge, etc.

In the indexable cutting insert K1, since the cutting edge is linearly inclined upwardly at the predetermined angle in the direction away from each of the neighboring nose portions, sharpness of the cutting edge is ensured during finish cutting and drop of strength of the cutting edge can be reduced. Meanwhile, since the land portion is disposed above the cutting edge, namely, the dimple formed adjacent to the nose portion is disposed below the cutting edge, chips pass over the dimple and the land portion during finish cutting and medium cutting, so that resistance of chips against the indexable cutting insert K1 is reduced through cut of chips by the chip breaker wall surface of the land portion such that finish cutting can be performed smoothly.

Meanwhile, in medium cutting, since chips flow smoothly in the same manner as described above, cutting resistance is reduced, chips are cut only by the wall surface of the land portion disposed above the cutting edge.

Furthermore, in rough cutting, since the cutting edge is so formed as to be inclined upwardly from each of the neighboring nose portions, height of the land portion relative to the cutting edge is reduced and width of the chip breaker from the cutting edge is gradually increased, so that chips flow smoothly without clogging and strength of the cutting edge is ensured.

Referring to FIGS. 10 to 13, there is shown an indexable cutting insert K2 according to a second embodiment of the present invention. The indexable cutting insert K2 is a triangular plate having a predetermined thickness. The indexable cutting insert K2 has three cutting edges 14 and a boss surface 31 of a substantially triangular shape having three projecting portions directed towards the nose portions 2, respectively. As shown in FIG. 10, the boss surface 31 has two concave portions between neighboring ones of the projecting portions. A groove wall 16' is formed around an overall periphery of the boss surface 31 so as to be inclined at a predetermined angle. Each of the cutting edges 14 has a ridge 15. A chip breaker groove 17' having a concave cross section is formed at the ridge 15. It can also be so arranged that the cutting edge 14 defines a curved surface projecting gently outwardly.

A first projecting ridge 19 extends from each of the projecting portions of the boss surface 31 directed towards each of the nose portions 2 so as to be disposed lower than the ridge 15 of each of the cutting edges 14. The first projecting ridge 19 integrally rises from the chip breaker groove 17' as shown in FIG. 12 so as to be symmetrical with respect to a bisector extending from the nose portion 2 to the center of a mounting hole 12 for mounting the indexable cutting insert K2 on an insert holder. Meanwhile, a pair of second projecting ridges 19' extend substantially at right angles to the ridge 15 of each of the cutting edges 14 from each of the projecting portions of the boss surface 31 directed towards each of the nose portions 2. As shown in FIGS. 10 and 13, the second projecting ridges 19' integrally rise from the chip breaker groove 17' so as to be disposed lower than the ridge 15 of each of the cutting edges 14. Each of the nose portions 2 has a radius of 0.5 to 1.5 mm so as to cut chips during light cutting such as finish cutting.

The first projecting ridge 19 is primarily arranged to cut chips during light cutting such as finish cutting. On the other hand, the second projecting ridges 19' are provided for passing, during rough cutting having a large depth of cut and a large feed rate, chips over the second projecting ridges 19' so as to bring the chips into collision with the groove wall 16' such that the chips are cut by the groove wall 16'. Meanwhile, in medium cutting having a depth of cut of 1.5 mm or more, chips pass over the second projecting ridges 19' so as to be cut by the groove wall 16' in the same manner as rough cutting.

In order to perform a cutting operation of a machine part by the indexable cutting insert K2 of the above described arrangement, in the case where either rough cutting is performed at the ridge 15 of each of the cutting edges 14 by using an initial large depth of cut and an initial large feed rate or medium cutting having a large depth of cut exceeding 1.5 mm is performed, chips pass over the second projecting ridges 19' so as to collide with the groove wall 16' of the boss surface 31 so that undesirable increase of cutting resistance may be increased. However, in the indexable cutting insert K2, since a pair of the second projecting ridges 19' extend substantially at right angles to the ridge 15 of each of the cutting edges 14 from the groove wall 16' of the boss surface 31, an area of contact of chips with the groove wall 16' is minimized, so that height of the groove wall 16' of the boss surface 31 can be reduced as much as possible. As a result, cutting resistance of chips can be restricted. To this end, it is desirable that the first projecting ridge 19 and the second projecting ridges 19' are formed lower than, not to mention, the boss surface 31 but the ridge 15 of the cutting edge 14.

Meanwhile, since the boss surface 31 is so curved as to project, at its intermediate portion located between the neighboring nose portions 2, towards the cutting edge 14 as shown in FIG. 10, chips smoothly flow outwardly during cutting such that cutting resistance of chips is further reduced. As described above, the second projecting ridges 19' contribute to smooth discharge of chips during rough cutting and medium cutting, while the first projecting ridge 19 contributes to smooth discharge of chips during light cutting. Therefore, in the indexable cutting insert K2, smooth discharge of chips is ensured through an overall range of cutting regardless of depth of cut and feed rate.

Furthermore, since the first projecting ridge 19 and a pair of the second projecting ridges 19' are so provided as to be symmetrical with respect to the bisector of each of the nose portions 2 and a pair of the cutting edges 14 interposing each of the noes portions 2 therebetween are also provided symmetrically with respect to the bisector of each of the nose portions 2, rough cutting, medium cutting and light cutting such as finish cutting for cutting at a small depth of cut and a small feed rate by using each of the nose portions 2 are uniformly performed at the three cutting edges 14, so that a service life of the indexable cutting insert K2 is lengthened and thus, general cutting ranging from light cutting to rough cutting can be securely performed by the single indexable cutting insert K2. As shown in FIGS. 12 and 13, the projecting ridges 19 and 19' are spaced distances h and h' may be so set as to be identical with each other.

Referring to FIGS. 14 and 15, there is shown an indexable cutting insert K3 according to a third embodiment of the present invention. The indexable cutting insert K3 has a boss surface 32 of a substantially triangular shape. The boss surface 32 has three gently curved concave peripheral portions each having the groove wall 16'. In the indexable cutting insert K3, chips smoothly flow over the second projecting ridges 19' so as to be cut by the groove wall 16' during rough cutting or medium cutting in the same manner as the indexable cutting insert K2. Furthermore, in the indexable cutting insert K3, chips are cut by the first projecting ridge 19 during light cutting at the nose portion 2 in the same manner as the indexable cutting insert K2.

Referring further to FIGS. 16 and 17, there is shown an indexable cutting insert K4 according to a fourth embodiment of the present invention. As shown in FIG. 16, the boss surface 32 is equally divided into three portions and has two convex portions formed at a central portion of each of its sides such that chips flowing over the second projecting ridges 19' are more securely cut by a groove wall 16" of the convex portions of the boss surface 32. As shown in FIG. 17, the ridge 15 of the cutting edge 14 is curved concavely and convexly. Thus, during rough cutting and medium cutting, chips flow smoothly towards the groove wall 16" of the boss surface 32 so as to be cut by the groove wall 16" efficiently.

Referring finally to FIGS. 18 and 19, there is shown an indexable cutting insert K5 according to a fifth embodiment of the present invention. The indexable cutting insert K5 has a boss surface 33 of a substantially triangular shape. The boss surface 33 has, at each of its sides, concave and convex portions larger than those of the boss surface 31 of the indexable cutting insert K2 such that chip disposal is smoothly performed during rough cutting. As shown in FIG. 19, a recess having a large inclined surface is formed at a portion of the ridge 15 of the cutting edge 14, which portion is adjacent to the nose portion 2. Thus, curling tendency of chips during medium cutting is improved so as to be discharged smoothly. The second projecting ridge 19' is provided rearwards of the recess of the ridge 15 of the cutting edge 14 so as to reduce cutting resistance during rough cutting and medium cutting.

The indexable cutting inserts K2 to K5 can be, needless to say, modified variously. For example, a minute recessed groove may be formed at the centerline of each of the projecting ridges 19 and 19' so as to cushion ride of chips over the projecting ridges 19 and 19' or collision of chips with the projecting ridges 19 and 19'. Furthermore, level of the first and second projecting ridges 19 and 19' can also be adjusted relative to levels of the boss surface and the ridge of the cutting edge.

As will be understood from the foregoing, in the indexable cutting inserts K2 to K5 of the present invention, the first projecting ridge having level lower than those of each nose portion and the ridge of each cutting edge rises integrally from the chip breaker groove so as to extend from each projecting portion of the boss surface confronting each nose portion to each nose portion and a plurality of the second projecting ridges rise, in the vicinity of the first projecting ridge, from the chip breaker groove so as to extend from the groove wall of the boss surface substantially at right angles to the cutting edges.

Therefore, in the indexable cutting inserts K2 to K5, region of chip disposal is increased during light cutting having small depth of cut and small feed rate and employing the first projecting ridge confronting the nose portion of the boss surface. In addition, also during rough cutting having large depth of cut and large feed rate, chips from a portion of the cutting edge other than the nose portion ride over the second projecting ridges and collide with the groove wall of the chip breaker wall so as to be cut by the groove wall. Consequently, in the indexable cutting inserts K2 to K5, region of chip disposal during cutting in an overall range is improved and thus, cutting in an overall range can be performed highly efficiently.

Furthermore, in the indexable cutting insert K5, since the ridge of the cutting edge is curved concavely, etc., width of the chip breaker groove is increased, so that curling tendency of chips is improved and thus, chips can be discharged efficiently and are fully cut by the second projecting ridges.

Moreover, in the indexable cutting inserts K2 to K5, since a plurality of the projecting ridges rise integrally from the chip breaker groove so as to be symmetrical with respect to the bisector of each vertex of the polygonal indexable cutting inserts K2 to K5, the cutting edge not only at a portion of the cutting edge other than the nose portion but also at the nose portion is used symmetrically with respect to the bisector of each vertex of the indexable cutting inserts K2 to K5 with lapse of time. Thus, the indexable cutting inserts K2 to K5 are used uniformly, thereby resulting in increase of service life of the indexable cutting inserts K2 to K5. Meanwhile, since the indexable cutting inserts K2 to K5 are formed symmetrically with respect to the bisector of each vertex of the indexable cutting inserts K2 to K5, the indexable cutting inserts K2 to K5 can be produced easily and can be mounted on an insert holder with much ease.

In addition, in the indexable cutting inserts K2 to K5, since cutting resistance in cutting ranging from rough cutting to finish cutting is small, wear of the cutting edge is reduced, power consumption required therefor is lessened and accuracy of cut surface of a workpiece is improved, thereby resulting in improvement of reliability of the workpiece.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. In an indexable cutting insert having a shape of a platelike polygon, polygon, in which a plurality of cutting edges are, respectively, formed at sides of the polygon and a boss surface formed with a mounting hole for mounting the indexable cutting insert on an insert holder is provided on each of opposite faces of the indexable cutting insert such that a chip breaker groove is formed between the boss surface and ridges of the cutting edges, the improvement comprising:

chip breaker groove having an inner wall extending from the cutting edge and an outer wall extending from the boss surface, a plurality of the projecting ridges rising integrally from the chip breaker groove and extending at each of the vertexes of the polygon, towards the ridges of the cutting edges from each of projecting portions of the boss surface;

said plurality of ridges include a first projecting ridge extending towards the nose portion and a pair of second projecting ridges provided at opposed sides of and adjacent to the nose portion;

said projecting ridges being formed as to be disposed lower, in level, then the boss surface and the ridges of the cutting edges, said first projecting ridge formed convexly angularly at the bottom of the chip breaker groove such that most of the outer side wall is exposed and said second projecting ridges form horizontally across the bottom of the chip breaker groove so as to bridge the inner and outer side walls such that a large area of the outer side wall is covered by the second projecting ridges.

* * * * *